(12) United States Patent
Mayfield

(10) Patent No.: US 8,122,602 B2
(45) Date of Patent: Feb. 28, 2012

(54) SIZING OF MAT MATERIAL

(75) Inventor: David Mayfield, South Bend, IN (US)

(73) Assignee: Hess Engineering, Inc., Niles, MI (US)

( * ) Notice: Subject to any disclaimer, the term of this patent is extended or adjusted under 35 U.S.C. 154(b) by 1316 days.

(21) Appl. No.: 11/739,908

(22) Filed: Apr. 25, 2007

(65) Prior Publication Data
US 2008/0263866 A1     Oct. 30, 2008

(51) Int. Cl.
*B21D 51/16* (2006.01)
*B01D 50/00* (2006.01)

(52) U.S. Cl. .......................................... 29/890; 422/168

(58) Field of Classification Search .................... 29/890; 422/168–183
See application file for complete search history.

(56) References Cited

U.S. PATENT DOCUMENTS

| | | | | |
|---|---|---|---|---|
| 4,711,009 A * | 12/1987 | Cornelison et al. | ............. | 29/890 |
| 4,969,264 A * | 11/1990 | Dryer et al. | ............. | 29/890 |
| 5,118,476 A * | 6/1992 | Dryer et al. | ............. | 422/179 |
| 5,332,202 A * | 7/1994 | Wagner et al. | ............. | 267/82 |
| 5,724,735 A * | 3/1998 | Ickes et al. | ............. | 29/890 |
| 6,389,693 B1 * | 5/2002 | Aranda et al. | ............. | 29/890 |
| 6,484,397 B1 * | 11/2002 | Collins et al. | ............. | 29/890 |
| 6,501,042 B2 * | 12/2002 | Alte et al. | ............. | 219/121.46 |
| 6,732,432 B2 * | 5/2004 | Foster et al. | ............. | 29/890 |
| 6,769,281 B2 * | 8/2004 | Irie et al. | ............. | 72/121 |
| 6,954,988 B2 * | 10/2005 | Mayfield | ............. | 29/890 |
| 7,111,392 B2 * | 9/2006 | Irie et al. | ............. | 29/890 |
| 7,174,634 B2 * | 2/2007 | Morikawa et al. | ............. | 29/890 |
| 7,174,635 B2 | 2/2007 | Irie et al. | | |
| 7,451,660 B2 * | 11/2008 | Martin | ............. | 73/819 |
| 2002/0124403 A1 * | 9/2002 | Eisenstock | ............. | 29/890 |
| 2003/0000088 A1 * | 1/2003 | Mayfield | ............. | 29/890 |
| 2003/0103876 A1 * | 6/2003 | Foster et al. | ............. | 422/180 |
| 2004/0237305 A1 * | 12/2004 | Morikawa et al. | ............. | 29/896.62 |
| 2006/0150382 A1 * | 7/2006 | Martin | ............. | 29/281.3 |

FOREIGN PATENT DOCUMENTS

| | | |
|---|---|---|
| EP | 1 344 911 A1 | 9/2003 |
| EP | 1 389 675 A2 | 2/2004 |
| EP | 1 482 140 A1 | 12/2004 |
| EP | 1 635 048 A2 | 3/2006 |
| WO | WO 2006/076469 A2 | 7/2006 |

OTHER PUBLICATIONS

International Search Report and Written Opinion for PCT/US2008/005291 issued by the European Patent Office on Jul. 25, 2008.

* cited by examiner

*Primary Examiner* — David Bryant
*Assistant Examiner* — Jacob Cigna
(74) *Attorney, Agent, or Firm* — Faegre Baker Daniels LLP

(57) ABSTRACT

The present invention relates to a spinning apparatus for forming a workpiece. The spinning apparatus includes at least one spinner capable of deforming the workpiece. The apparatus allows for the forming of the workpiece in four different axes. The spinning apparatus includes an arrangement allowing for the vertical arrangement of the workpiece while the spinner is working on the workpiece. The spinning apparatus includes a clamp for holding the workpiece vertically. The spinner is positioned vertically below the clamp and the workpiece.

24 Claims, 7 Drawing Sheets

Measured Data

SIZING OF MAT MATERIAL

BACKGROUND OF THE INVENTION

The present invention relates to a method of assembling a catalytic converter including an outer member, a monolith substrate and a mat material. Specifically, the present invention relates to a method of ascertaining the size of the outer member that is necessary to assert a desired pressure on at least one of the components located within the outer tube.

DESCRIPTION OF THE PRIOR ART

U.S. Pat. No. 6,484,397 discloses a Method of Assembling a Catalytic Converter for Use in an Internal Combustion Engine. The disclosed method of assembling a catalytic converter includes four steps. The first step involves providing a metal shell having a predetermined shape that substantially matches the shape of a ceramic substrate. The second step requires the insertion of a resilient supporting mat material into the metal shell thereby forming an encircling mat layer. The third step relates to the compressing of the encircling mat layer in order to achieve an initial gap bulk density. In the fourth step, the encircling mat layer may be released from compression. Prior to the mat layer reaching a desired final gap bulk density, a portion of the substrate may be inserted into the mat layer as the mat layer encircles the metal shell. After the substrate has been inserted into the mat layer located within the metal shell, the mat layer may be fully released so that the mat layer presses against the substrate and reaches the final predetermined gap bulk density.

U.S. Pat. No. 6,769,281 discloses a Method and Apparatus of Producing a Columnar Member Container. The disclosed method details the production of a container configured to hold a columnar member in a cylindrical housing. In the final assembly, a shock absorbent member may be wrapped around the columnar member.

The method disclosed in U.S. Pat. No. 6,769,281 includes at least five steps. The first step relates to the compression of at least a part of the shock absorbent member wrapped around the columnar member. The compressing step may be achieved by radially moving a pushing member in the direction of the longitudinal axis of the columnar member. The second step involves the measuring of the pressure applied to the shock absorbent member by the pushing member. The distance intermediate the axis of the columnar member and the end of the pushing member may be measured and recorded when the pressure equals a predetermined target pressure. The measured distance represents a target radius, and the measuring and recording of the target radius is the third step of the method. The fourth step of the method includes the loose insertion of the columnar member and the shock absorbent member into the housing. In the final step of the disclosed method, the diameter of the housing is reduced along the longitudinal axis of the housing until the inner radius of the housing equals the target radius. Once the size of the diameter of the housing is reduced to the size of the target radius, the housing retains both the columnar member and the shock absorbent member in a relatively fixed position at a predetermined target pressure.

U.S. Pat. No. 6,954,988 is assigned to the assignee of the present invention, and discloses a Method and Apparatus for Manufacturing a Catalytic Converter. The disclosure of U.S. Pat. No. 6,954,988 is hereby expressively incorporated herein by reference. The method taught by the patent relates to the assembly of a catalytic converter comprising an outer tube member that internally compresses a monolith substrate. The disclosed catalytic converter may further include a mat material wrapped around the monolith substrate, so that in the final assembly the mat material is positioned intermediate the outer tube and the monolith substrate. In addition, the patent discloses catalytic converters that may include a plurality of monolith substrate members and heat shields positioned within the outer tube member. The disclosed method of assembling catalytic converters includes the step of compressing the mat material and the monolith substrate in order to measure and ascertain the characteristics of forces that may possibly be applied to the combination of the mat material and monolith substrate during assembly of the converter. Compression jaws, compression rollers, and/or a spinning apparatus may be used to shrink the outer tube in order to compress the mat material. The shrinking of the outer tube and the compression of the mat material may occur in a single stage or in multiple stages.

U.S. Pat. No. 7,174,635 discloses a Method for Producing a Columnar Member Container. The disclosed method includes at least seven steps. The first step of the method involves wrapping a shock absorbent member around a columnar member, and the second step requires that the support member support at least one end of the cylindrical housing. In the third step, the support member may be located within a cylindrical guide member including an inner tapered portion. The next step calls for the insertion of the shock absorbent member and the columnar member into the housing, and the members may be inserted into the housing through the tapered portion. Once inserted, a pushing member may then press upon the columnar member in order to move the columnar member along the longitudinal axis of the cylindrical housing. In the sixth step, the support member and a shrinking mechanism may be moved relative to each other. Lastly, during the final step of the disclosed method, the shrinking mechanism may be used to reduce the diameter of part of the cylindrical housing.

SUMMARY OF THE INVENTION

The present invention relates to a method of manufacturing a catalytic converter comprised of an outer tube, a monolith substrate and a mat material. The mat material may be positioned in a surrounding relation relative to the monolith substrate. An embodiment of the method may include the steps of establishing a curve representative of the characteristics of the mat material; gauging a combination of the monolith substrate and the mat material to establish compression characteristics; inserting the combination of the monolith substrate and the mat material into the outer tube; determining a diameter of the outer tube necessary to assert a desired pressure on the combination; and shrinking the outer tube to approximately the diameter.

In embodiments, the gauging step of the method may include the steps of compressing the combination until a gauging desired pressure value is reached; determining the displacement of the outer boundary of the combination at the desired pressure value; releasing the combination from compression; recompressing the combination until reaching the displacement of the outer boundary of the combination; measuring the pressure asserted on the combination; and releasing the combination from compression.

In embodiments of the invention, the gauging desired pressure value may fall within a range of about 30% to 95% of the desired pressure. In embodiments of the invention, the gauging desired pressure value may fall in within a range of about 30% to 80% of the desired pressure.

In embodiments of the invention, the step of measuring the pressure asserted on the combination may further include the step of monitoring the pressure asserted on the combination until a substantially settled pressure value is achieved. In embodiments of the invention, the step of monitoring the pressure asserted on the combination until a substantially settled pressure value is achieved may further include the steps of populating a matrix of finite size with pressure values until the matrix is filed and then replacing the oldest values with the newest values until the newest value is substantially equal to the oldest value.

In embodiments of the invention, the step of measuring the pressure asserted on the combination may occur approximately fifteen seconds after the recompressing step.

In embodiments of the invention, linear regression may be utilized in the determining the diameter of the outer tube necessary to assert the desired pressure on the combination.

Furthermore, in embodiments of the invention, the establishing step may include the step of compressing at least a portion of a representative mat material encompassing a member to obtain a first set of force data. In embodiments of the invention, the member may be a blank. In embodiments of the invention, the member may be a representative monolith substrate. In embodiments of the invention, the compressing step includes advancing at least one contact pad a predetermined displacement into the mat material and collecting a pressure value following the elapsing of a predetermined time, advancing the at least one contact pad the predetermined displacement into the mat material and collecting a second pressure value following the elapsing of the predetermined time. The predetermined time may be approximately equal to fifteen seconds. In embodiments of the invention the establishing step may include the step of compressing at least a portion of a plurality of mat material encompassing a member to obtain a plurality of force data. The plurality of mat materials may differ in thickness. In embodiments of the invention the plurality of force data may be utilized to plot the curve. The method may further include the step of compressing a least a second portion of the representative combination in order to obtain a second set of force data in embodiments of the invention. Furthermore, the mat material may be at least partially formed from an intumescent material.

An embodiments of the invention includes a method of manufacturing a catalytic converter comprised of a tube having a diameter and a combination including a monolith substrate and a mat material. The method may include the steps of compressing a plurality of representative combinations including a representative mat material encompassing a member to obtain a set of data characterizing the representative combinations; constructing a curve based upon the set of data; gauging the combination to obtain a set of data characterizing the combination; inserting the combination into the tube; and reducing the size of the tube in order to ensure friction created by contact between the combination and the tube substantially prevents the movement of the combination relative to the tube; wherein the size of the tube is reduced based upon the curve and the set of data characterizing the combination.

An embodiments of the invention includes a method of manufacturing a plurality of catalytic converters each including a tube member and a combination including a mat material and a monolithic substrate. The method may include the steps of compressing at least a portion of a plurality of representative samples to obtain a first set of characteristic data of the mat material; compressing at least a portion of a first combination to obtain a second set of characteristic data; inserting the first combination into a first tube; determining a target pressure asserted by the tube on the first combination; calculating a desired size for the first tube to assert the target pressure upon the first combination, the calculation based upon the first set of characteristic data and the second set of characteristic data; shrinking at least a portion of the first tube to the desired size for the first tube; compressing at least a portion of a second combination to obtain a second set of data; inserting the second combination into a second tube; calculating a desired size for the second tube to assert the target pressure upon the second combination, the calculation based upon the first set of characteristic data and the third set of characteristic data; and shrinking at least a portion of the second tube to the desired size for the second tube.

BRIEF DESCRIPTION OF THE DRAWINGS

The above-mentioned and other features and advantages of this invention, and the manner of attaining them, will become more apparent and the invention itself will be better understood by reference to the following description of various embodiments of the invention taken in conjunction with the accompanying drawings, wherein.

Corresponding reference characters indicate corresponding parts throughout the several views. The exemplifications set out herein illustrate embodiments of the invention, in various forms, and such exemplifications are not to be construed as limiting the scope of the invention in any manner.

DETAILED DESCRIPTION OF AN EMBODIMENT OF THE INVENTION

Figure 1:
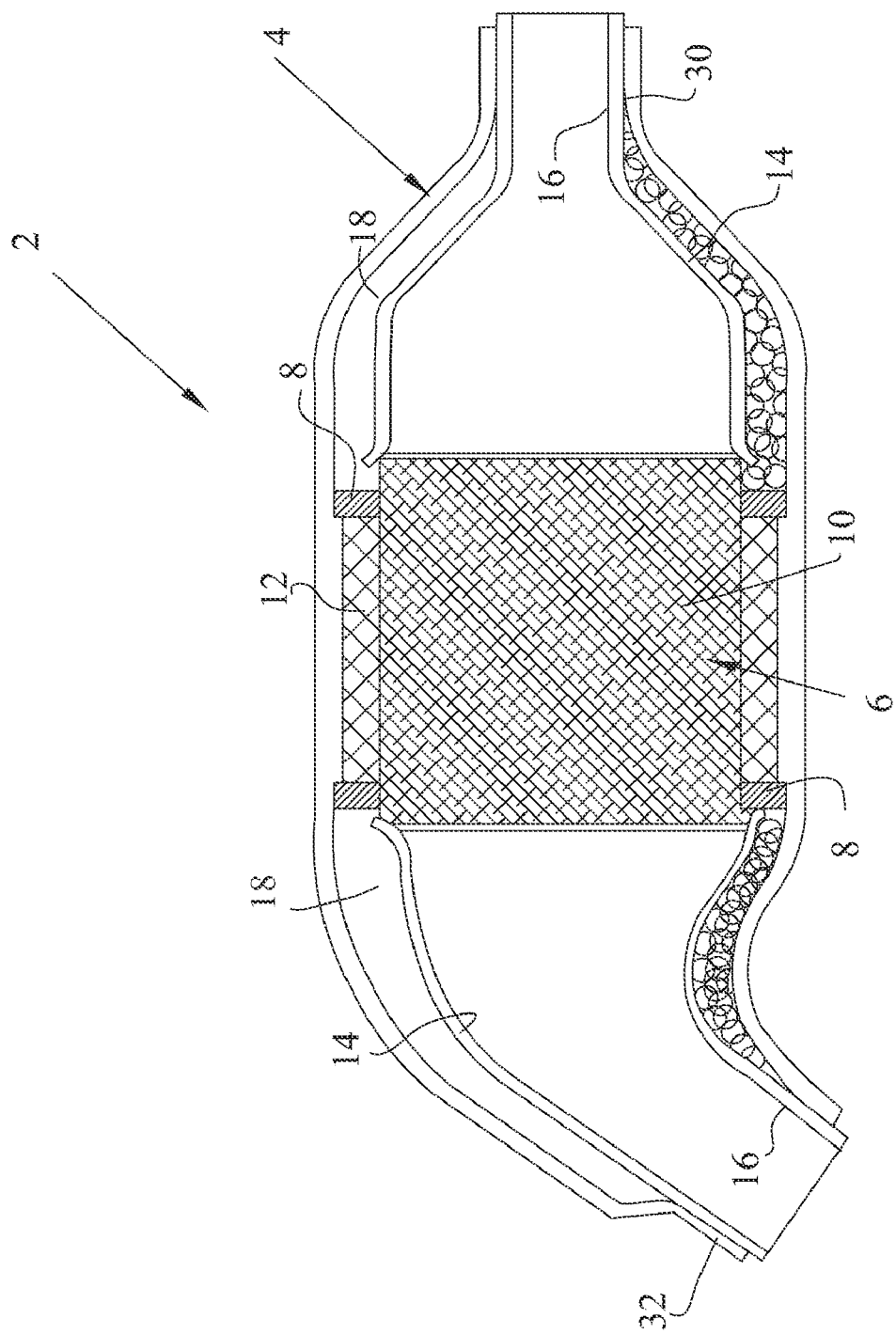
FIG. 1 depicts a section view of an example of a catalytic converter.

With reference first to FIG. 1, an example of a catalytic converter is generally indicated by numeral 2. The depicted embodiment of catalytic converter 2 includes an outer tube member 4, and a brick combination, indicated by numeral 6, and a pair of end seal members, each indicated by numeral 8. Brick combination 6 includes a monolith substrate 10 and a mat material 12. The depicted embodiment of the catalytic converter 2 further includes a pair of heat shield members, each indicated by numeral 14, located in a necked-down section 16 forming an air gap 18.

Monolith substrate 10 may be manufactured from any suitable materials utilized in the art. Mat material 12 may be formed from any suitable material, such as a stainless steel mesh-type material or a nonflammable, fibrous-type material, for example. Generally, the mat material 12 may be at least a partially compressible material.

It should be noted that in the assembled catalytic converter 2, the outer tube member 4 generally asserts a pressure against the brick combination 6. Specifically, the inner surface of outer tube member 4 asserts pressure on the mat material 12, which, in turn, asserts pressure on the monolith substrate 10. The frictional force created by the pressure asserted on the mat material 12 by the outer tube member 4 helps to retain the brick combination 6 in a relatively fixed position with respect to the outer tube member 4. In instances when the outer tube member 4 is sized too large relative to the brick combination 6 too little pressure exists between the inner surface of the outer tube member 4 and the brick combination 6. When too little pressure exists between the outer tube member 4 and the brick combination 6, insufficient frictional forces may be generated between the mat material 12 and outer tube member 4 to prevent movement of the brick combination 6 relative to the outer tube member 4. Conversely, when the outer tube member 4 is sized too small relative to the brick combination 6, too great of pressure may be asserted on the brick combination 6. The excess pressure may cause the monolith substrate 10 to fracture or over compress the mat material 12.

Traditionally, gap bulk density (GBD) has been utilized as an indicator of the pressure asserted on the mat material 12 by the outer tube member 4. GBD represents a simple volume weight description of the mat material 12 within the outer tube member 4. GBD may be calculated by dividing the basis weight of the mat material 12 by the average distance separating the inner surface of the outer tube member 4 and the monolith substrate 10. The basis weight is calculated by dividing the weight of the mat material 12 by the area of the mat material 12. Although GBD has traditionally been utilized as a mechanism to estimate the pressure required to prevent movement of the brick combination 6 with respect to the outer tube member 4, the GBD may have a limited relationship in restraining the monolith substrate 10.

Figure 2:
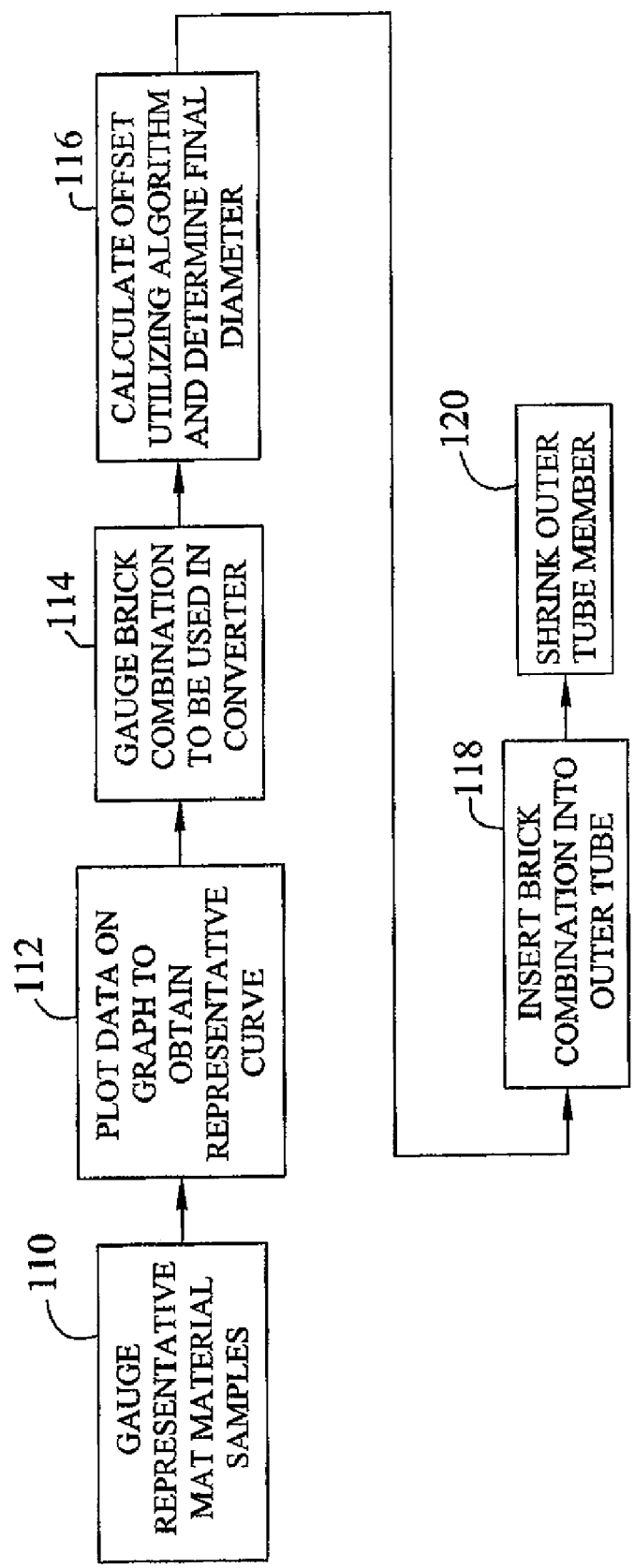
FIG. 2 depicts a block diagram illustrating an embodiment of the present invention.

FIG. 2 depicts a flow diagram illustrating exemplary steps of a method of assembling a catalytic converter representing an embodiment of the present invention. In the embodiment of the method depicted, the method includes the step of gauging at least representative sample of mat material, indicated by numeral 110, plotting the data on a graph to obtain a representative pressure curve, indicated by numeral 112, gauging a brick combination to be used in a catalytic converter, indicated by numeral 114, calculating an offset utilizing an algorithm to determine a final diameter, indicated by numeral 116, inserting the brick combination into an outer tube member, indicated by numeral 118, and shrinking the outer tube member to achieve the desired diameter, indicated by numeral 120.

Figure 3:
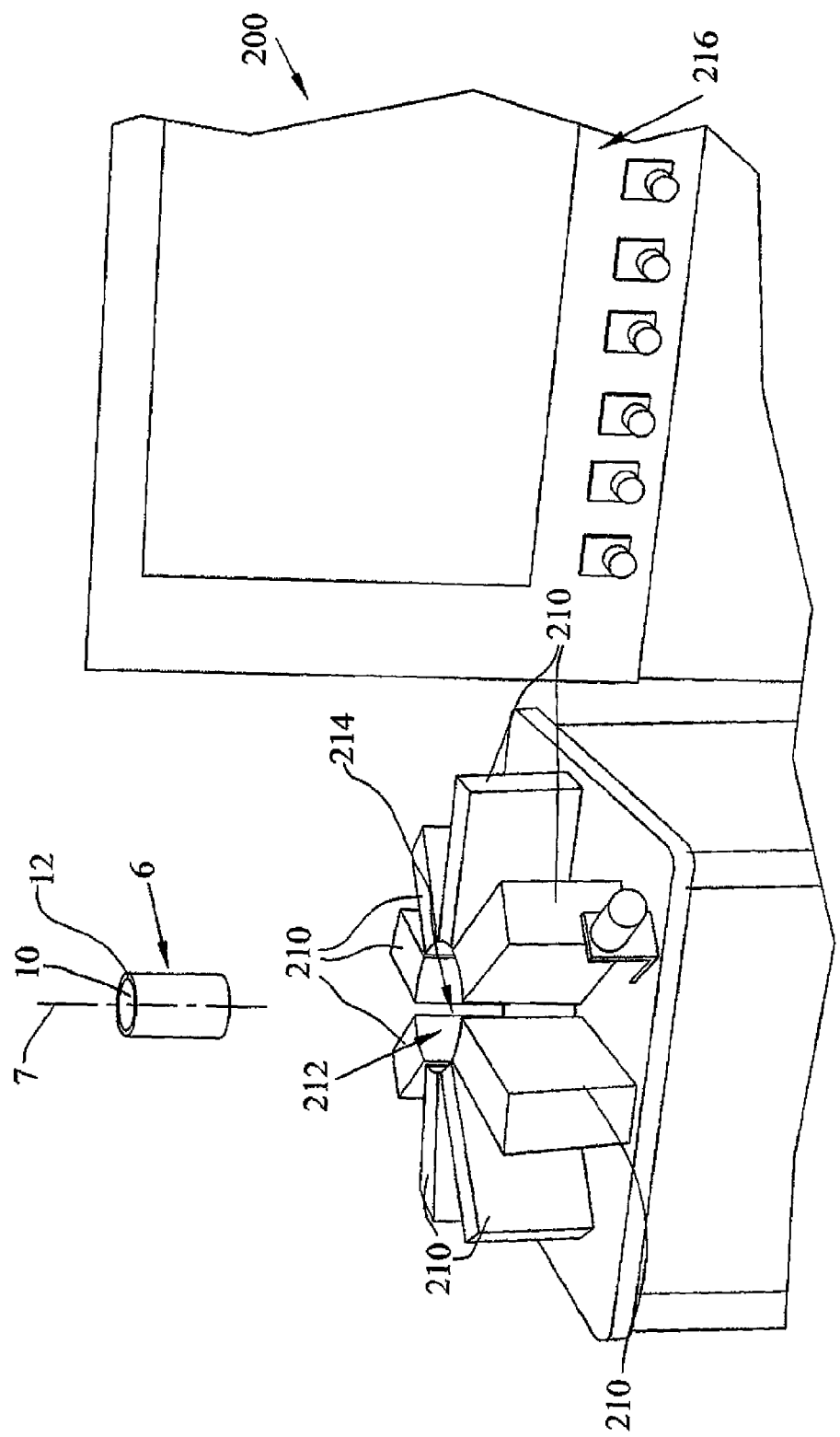
FIG. 3 depicts an embodiments of a gauging apparatus that may be utilized in practicing embodiments of the present invention.

The step of gauging a representative sample, exemplified by block 110 in FIG. 2, generally involves compressing at least one representative mat material sample with any suitable gauging station such as the gauging station depicted in FIG. 3 and generally indicated by numeral 200. In the depicted embodiment, gauging station 200 includes a plurality of gauging members, each indicated by numeral 210. The gauging members 210 establish a receiving area, generally indicated by numeral 212. Each of the gauging members 210 are capable of moving toward and away from the center, indicated by numeral 214, of the receiving area 212 along a substantially linear path. Each of the gauging members 210 may include a sensor (not shown) configured to measure the pressure asserted by the members 210 upon a brick combination located within receiving area 212. In embodiments of gauging station 200, sensors located external to the gauging members 210 may be utilized to measure the pressure asserted by the gauging members 210. The gauging station 200 may also include a controller 216 configured to control the movement of the gauging members 210 relative to center 214. The controller 216 may also include any suitable mechanism capable of recording the pressure asserted by the members 210 at positions relative to the center 214. Controller 216 may be any suitable mechanism capable of performing the described functions, such as a computer, for example. It should be noted that in embodiments of the gauge apparatus 200, the functions of controller 216 may be distributed to any number of components. For example, a first computer may be utilized to control and record the locations of the members 210 relative to the center 214, and a second computer may be utilized to measure and record the pressure asserted by the members 210.

With reference to FIG. 3, the following description represents an exemplary usage of the above described gauging apparatus 200 in gauging a brick combination 6 comprising a monolith substrate 10 and a mat material 12. In order for gauge apparatus 200 to accurately gauge brick combination 6, brick combination 6 must be located within receiving area 212. Generally, the brick combination 6 may be positioned such that the longitudinal axis 7 of the brick combination 6 aligns with, and extends through, the center 214 of the receiving area 212. When the above described embodiment of the gauge apparatus 200 is utilized to test a substrate, the controller 216 may move the gauging members 210 a predetermined distance toward the center 214 of receiving area 212 so that the gauging members 210 begin to compress brick combination 6. Once the gauge members 210 have traveled the predetermined distance, the controller 216 may measure and record the pressure asserted by the members 210. The gauge apparatus 200 may also be configured to recognize the first contact between the members 210 and the brick combination 6 being gauged, and set the first contact position as the outer boundary of the brick combination 6. In this manner the gauge apparatus 200 may determine the displacement of the members 210 with respect to outer surface of brick combination 6 as the members 210 compress the combination 6. In addition, as the members travel in the direction of center 214, and compress the brick combination 6, the controller 216 may record the pressure imparted by the members 210 onto the brick combination 6 at discrete positions.

Apparatus 200 may also be configured to move the members 210 from the outer border of a brick combination 6 toward the center 214 of receiving area 212 until the members 210 begin to assert a predetermined pressure against the brick combination 6. Once the predetermined pressure is reached, the controller 216 may record the location of the members 210 with respect to the initial position of the outer boundary of the brick combination 6, which represents the displacement of the outer boundary of the mat material 12 at a given pressure.

In order to perform the gauging step 110 of the present embodiment of the invention as set forth in the flow chart of FIG. 2, gauge station 200, or any other suitable type of gauge station, may be utilized to gauge samples of mat material 12. In order to proceed with gauging step 110, a sample of the mat material 12 may be wrapped around a blank representative of a monolith substrate. The mat material 12 and brick combination 6 may be placed within the receiving area 212 in a manner similar to that described above. Once the combination is properly located within receiving area 212, controller 216 may direct the members 210 toward the center 214 of receiving area 212. As the members 210 move toward the center of receiving area 216 at predetermined positions, the members 210 may pause for a predetermined duration, or dwell time. Once the predetermined dwell time has elapsed, the controller 216 records the displacement of the members 210 and the asserted pressure. After recording the displacement and pressure, the controller 216 may advance the members 210 a further distance. After the members 210 advance the predetermined distance, the members 210 may again pause for the dwell time. Once the dwell time has elapsed, the pressure and displacement of the members may again be recorded by the controller 216. This process may be continually repeated until a final pressure is reached. In general, the final pressure may be greater than the desired final holding pressure in the catalytic converter. Upon reaching the final holding pressure and recording the displacement and pressure following the dwell time, the controller 216 may back the gauge members 210 away from the representative brick combination 6 until the combination 6 may be freely removed from the receiving area 212.

The above described process may be repeated multiple times with various combinations of blanks and samples of mat material. The blanks and mat material utilized in subsequent testing may vary in size from the samples previously tested. For example, the samples of mat material that may be tested during this initial gauging process may vary in thickness and weight from the first mat material tested. Moreover, the thickness and weight of the mat material may cross the spectrum of the expected thickness and expected weight for mat material that may be received from a supplier during production of a catalytic converter.

Similarly, the size of the blanks utilized to represent the monolith substrates in the pre-gauging testing may also vary in size during this testing. For example, the diameter of the blanks may vary from the smallest expected value for a monolith substrate to the largest expected value of a monolith substrate.

Furthermore, multiple combinations of mat material and blanks may be tested in this pre-gauging step. In addition, the sizing of the mat material and blank may be intermixed. For example, a combination of thicker mat material with a heavier weight may be coupled with a blank having a diameter on the lower end of the spectrum. Other embodiments of the representative sample may include a thinner mat material with a smaller weight coupled with a blank having a diameter that falls on the larger end of the spectrum. The completion of the gauging of the various representative mat material and blank combination completes the first step of the currently described exemplary method.

Figure 4:
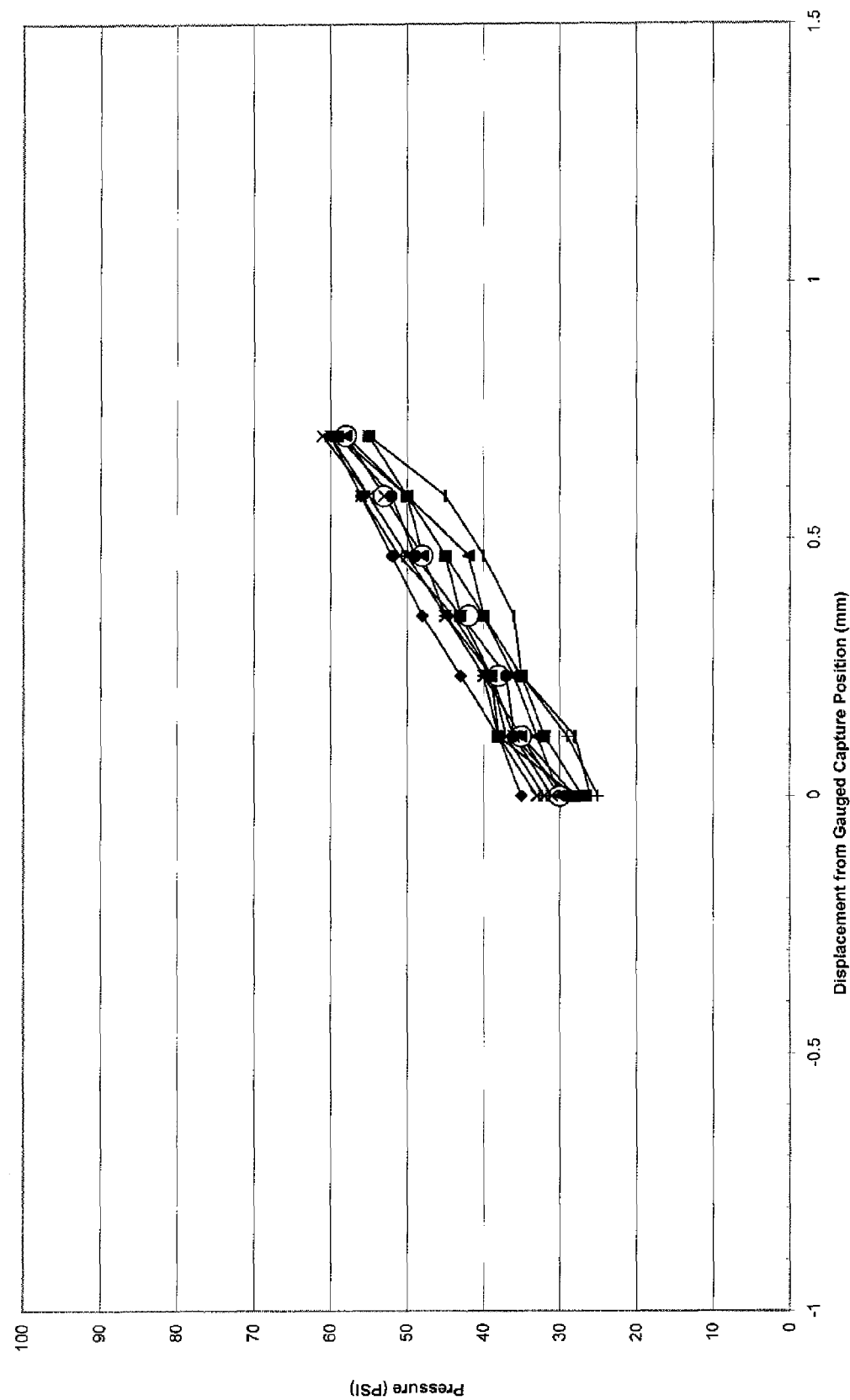
FIG. 4 depicts a curve illustrating an example of testing data.
Figure 5:
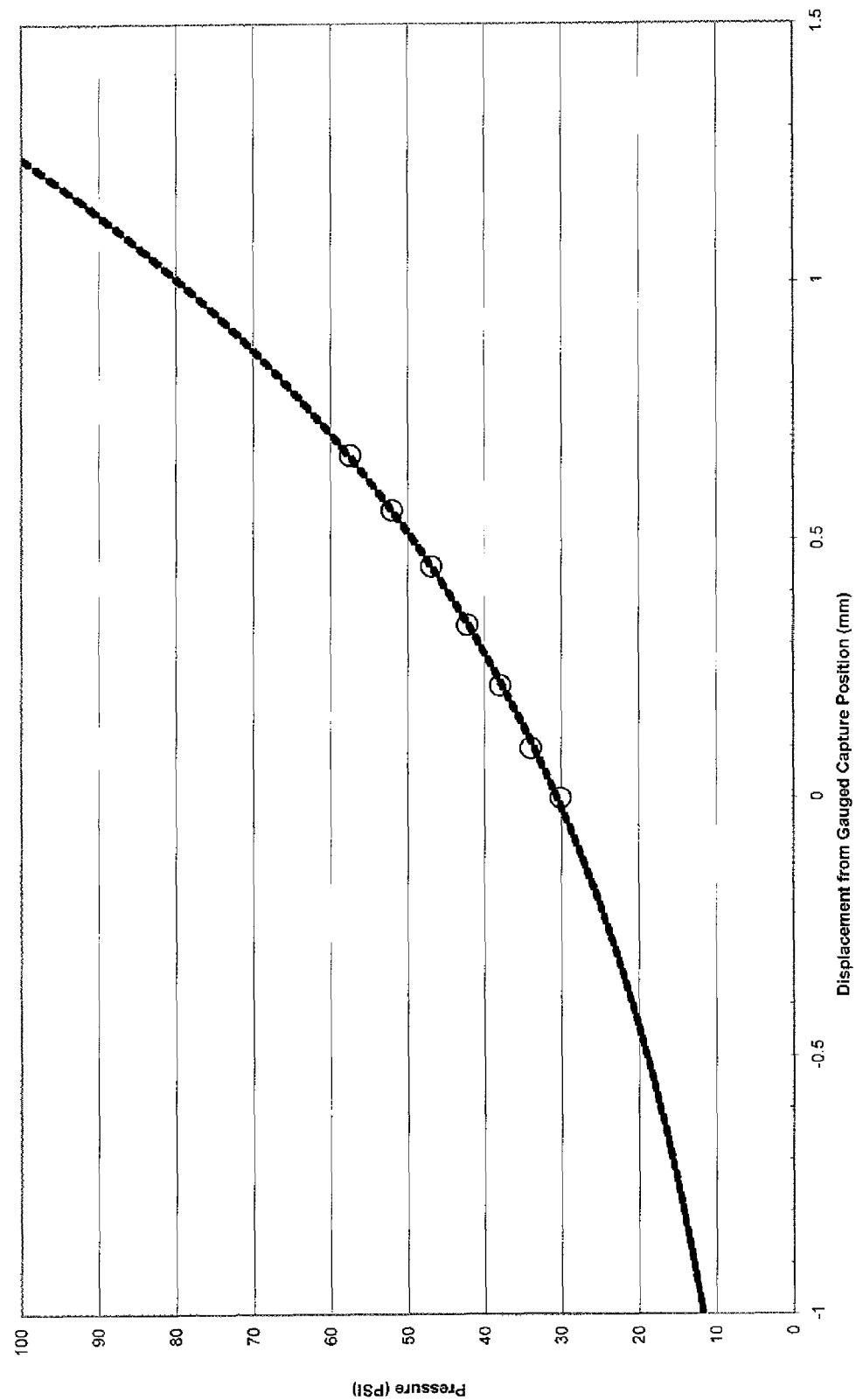
FIG. 5 depicts an example of a single curve representing the data depicted in FIG. 4.

In accordance with block 112 of FIG. 2, once the various representative samples have been gauged, the data recorded by the controller for each sample may be plotted on a graph similar to that depicted in FIG. 4. In the graph, the values for the measured pressure for each sample is plotted on the y-axis of the graph, and the values for the displacement recorded during the gauging process are plotted on the x-axis of the graph. In general, the greater the displacement, the greater the measured pressure. Once all of the measured data has been plotted on a pressure versus displacement graph, the data may be combined into a representative data curve, in any suitable manner, and plotted as shown in FIG. 5. For example, the collective data plotted on the pressure versus displacement curve of FIG. 4 may be averaged to obtain the representative curve.

It should further be noted that any number of data points may be measured and recorded for the representative combinations tested. Furthermore, the test points may fall within any suitable range for the representative combination. For example, in embodiments of the invention, the inventor anticipates that the range of pressure of the tested representative combinations may begin well below the final targeted pressure and continues until the targeted pressure has been exceeded. In addition, in embodiments of the invention, the inventor anticipates that the pressure at least five different displacements may be measured. It should be noted that in embodiments of the invention, the greater the amount of data measured, in general, the greater the time that may be required to find the representative curve.

Once the representative relaxed pressure curve for the mat material of FIG. 5 has been obtained in accordance with step 112, in the present example of the invention, the combination of mat material and monolith substrate to be utilized in a catalytic converter is placed in the gauging apparatus and measured, as represented by the block of FIG. 2 indicated by numeral 114. In order to gauge the mat material and monolith substrate, the brick combination for the catalytic converter is first placed in gauge apparatus 200 in a manner similar to that mentioned above. As should be understood by one with skill in the art, manufacturing specifications for the final catalytic converter will define a maximum pressure that a manufacturer will allow to be imparted upon the monolith substrate without rejecting the final assembly. Accordingly, for some manufacturers the value may not be exceeded during gauging.

Once the combination of mat material and monolith substrate have been placed within the gauge apparatus, the gauge members may be moved toward the brick combination in order to contact the brick combination, and the controller will continue to direct the gauge members toward the center of the combination. The gauge members will continue toward the center of the receiving area until the gauge members begin to assert a predetermined pressure value upon the brick combination. In embodiments of the invention, the predetermined pressure value may be based upon the maximum pressure that may be asserted against the combination of mat material and monolith substrate. For example, in the present embodiment, the gauge members will continue to move toward the controller of the receiving area until a pressure substantially equivalent to 80% of the maximum pressure of the combination is reached. It should be noted that maximum pressure, as used herein, refers to the maximum pressure that one desires to assert against the brick combination in the fully assembled catalytic converter. In the described embodiment, once the gauge members achieve the pressure value approximately equal to 80% of the maximum value, the controller may record the displacement of the gauge members. In embodiments of the invention, the predetermined pressure value may fall within a range of about 30-80% of the maximum value in the final assembly of the converter. In other embodiments, the predetermined pressure value may fall within a range of about 30%-90% of the maximum value. Still, in other embodiments of the invention, the predetermined pressure value may fall within a range of about 30%-95% of the maximum value. Furthermore, in embodiments of the invention, the predetermined pressure value may be as high as 98% or 99% of the maximum value.

As will be understood by one with skill in the art, the mat material will begin to relax after the initial compression. Consequently, if the gauge members are held at a fixed displacement, the pressure asserted by the gauging members will gradually decrease to a point as the mat material relaxes. Accordingly, as the mat material relaxes, the controller will move the gauge members toward the center of the receiving area in order to keep the pressure on the mat material approximately equivalent to the desired pressure. While doing so, the controller may continue to monitor the displacement of the gauge members. Once the displacement of the gauge members becomes relatively constant for a predetermined time period, the controller may record the measured displacement. It should be noted that the predetermined time period may be any suitable time such as 15 seconds, for example. In embodiments of the invention, it should be noted that the displacement may be measured as soon as the predetermined pressure value is reached, without allowing for the elapsing of a dwell time or by having a shorter dwell time, such as one second.

The controller may determine when the pressure has settled in any suitable manner. For example, in embodiments, the controller may record only a predetermined set of displacement values in a matrix of finite size. Once the matrix has been filled, as new displacement values are added to the matrix, the oldest values may be removed. Accordingly, when the first and final displacement values are substantially equivalent, the gauge members are stabilized and the controller may record the final displacement value. The exact pressure value at the final displacement may also be recorded.

Upon recording the final displacement and the pressure value asserted on the combination, the gauge members may now back away from the brick combination. In embodiments of the invention, the gauge members may move away from the center of the brick combination until substantially zero pressure is asserted against the brick combination. In embodiments of the invention, the gauge members may back away from the brick combination until the members no longer contact the brick combination.

Once the gauge members have backed off from the brick combination, the gauge members may recompress the brick combination. In embodiments of the invention, recompression may be achieved by moving the gauging members to the recently measured displacement position determined in the initial compression step. During recompression, once the gauge members reach the desired position, the controller will record the initial pressure value asserted during this recompression. The pressure value may differ from the pressure value measured during the initial compression.

As the recompression of the brick combination continues, the controller may continue to hold the gauge members in a substantially fixed position at the previously determined displacement value, and the controller may continue to record the pressure asserted by the gauge members on the monolith substrate. Generally, when the members initially arrive at the previous displacement, a peak pressure is asserted on the mat material. The peak pressure value will be recorded and then the pressure asserted by the gauge members on the brick combination will generally fall as the mat material relaxes. The pressure at which the mat material finally settles may be determined by recording the falling pressure values in a matrix of finite size. Once the matrix has been filled with data, new values of the pressure will replace the oldest values. Whenever the oldest value in the matrix is substantially equivalent to the newest value in the matrix, a substantially settled pressure has been achieved. Once the substantially settled pressure has been determined, the actual displacement and settled pressure may be recorded, and the gauge members may be backed off the brick combination. It should be noted that in embodiments, the gauge members may be held in a relatively fixed position for a predetermined time period and then the pressure may be recorded. Once the final pressure value has been recorded, the gauge members may be backed away from the brick combination thereby completing the compression and recompression step.

It should be noted that in embodiments of the invention, during the recompression step, once the gauge members reach the predetermined displacement position, the pressure may be measured for a predetermined dwell time. Once the predetermined dwell time has elapsed, the pressure drop at that time may be recorded and the recompression step is completed. In addition, it should be noted that in embodiments of the invention, the displacement chosen in the recompression step may be larger, or in other words, the brick combination may be compressed to a small diameter, than that determined in the initial compression step. Choosing a displacement value larger than the previously measured displacement may occur due to the undetermined pressure drop associated with the recompression of the brick combination.

Block 116 of FIG. 2 represents the next step of the exemplary embodiment. In this step, the data acquired in the gauging of the brick combination 6 in conjunction with the representative curve depicted in FIG. 5, may be utilized to develop a target diameter of the outer tube member 4. Specifically, the data for the gauged brick combination 6 may be utilized to calculate an offset that may be applied to the representative curve.

In general, the offset represents a correction factor that accounts for the loss of resiliency of the mat material upon recompression. Whenever mat material is compressed, released from compression and recompressed, the mat loses some resiliency. Accordingly, initially gauge data ceases to be accurate following the initial measurement. The pressure losses associated with recompression may depend on numerous factors, such as the type of mat material being utilized, the thickness of the mat material, the manufacturer of the mat material, the peak pressure asserted on the mat material during gauging and whether the mat material is an intumescent material.

Accordingly, the offset that is calculated accounts for the reduction of pressure associated with a mat material following recompression. The offset may be determined in any suitable manner. For example, linear regression may be utilized to determine an equation for the offset based upon the data previously obtained. In embodiments of the invention, any other suitable method may be utilized to develop an equation to represent the offset. For example, the data recorded during the relaxation of the mat material may be utilized to develop an exponential equation that represents the offset.

In instances where linear regression is utilized to develop the offset or delta, the equation for a line, $y=mx+b$, may be utilized to calculate the offset. In the previous equation, y represents the pressure drop attributable to the recompression of the mat material, and m represents slope. Slope may be estimated from an applicable portion of the representative pressure curve developed from the testing of the representative mat material and blank combination samples. The letter b represents the y intercept, and generally, the y intercept may be estimated as 0, as zero displacement results in no pressure being asserted on the mat material. Knowing the values for y, m and b one may solve the above equation for x, which represents an estimate as to the adjustment of the linear displacement necessary to achieve the desired pressure in the assembled catalytic converter.

Once the offset has been calculated for the gauged brick combination of mat material and monolith substrate, the final diameter of the outer tube member necessary to impart the desired final pressure on the brick combination gauged in the previous step may be calculated. The final diameter of the outer tube member may be determined by using the offset calculated above, in addition to the general relaxed pressure curve. Specifically, one could determine a displacement value necessary to achieve a desired pressure from the representative pressure curve and offset the displacement value by the offset value calculated above in order to determine the desired diameter of the outer tube member to assert the desired pressure upon the brick combination and the assembled catalytic converter.

Once the combination of mat material and monolith substrate has been gauged by the gauge apparatus, and the desired size of the outer tube member has been determined, the brick combination may be inserted into an unformed outer tube. In embodiments of the invention, the outer tube member may be pre-compressed in order to ensure the outer tube member imparts at least a minimal frictional force upon the combination in order to ensure that the combination is retained within the outer tube member during the assembly process of the catalytic converter. In embodiments of the invention, the brick combination may be loosely inserted into the outer tube member. Irregardless of whether the outer tube member has been pre-compressed, the brick combination may be inserted into the outer tube member in any suitable manner. It should be noted that the speed of insertion of the combination into the tube member may be dependent upon the amount of preshrinking imparted on the outer tube member. In addition, it should be noted that the pressure initially asserted upon the combination of the mat material and the monolith substrate by the outer tube member will decrease slightly over time as the mat material relaxes.

Figure 6:
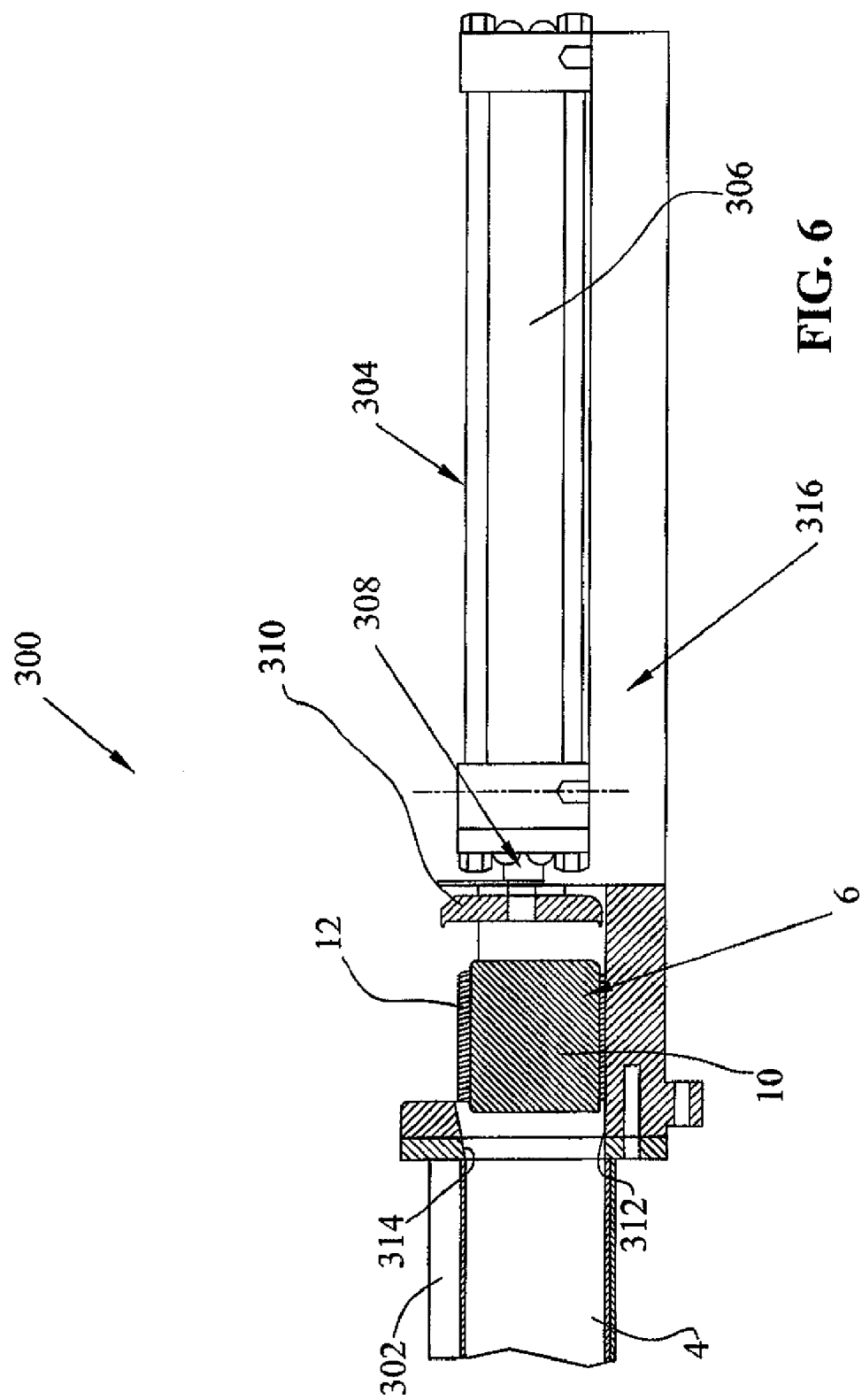
FIG. 6 depicts a section view of a stuffer apparatus that may be utilized in practicing embodiments of the present invention.

FIG. 6 depicts an insertion apparatus, generally indicated by numeral 300, configured to insert a brick combination 6 into an outer tube member 4. In the depicted embodiment, apparatus 300 includes a U-shaped loading section 302 configured to position outer tube member 4. Apparatus 300 also includes a cylinder mechanism 304. Cylinder mechanism 304 may comprise any suitable cylinder utilized in the art, such as a pneumatic or a hydraulic cylinder, for example. In the depicted embodiment, cylinder mechanism 304 includes a cylinder portion 306 comprising a rod portion section 308 and a pusher section 310. Pusher section 310 substantially aligns with an opening 312, that abuts a tapered member 314, such as a funnel, for example. In the depicted embodiment, a cylinder stand 316 supports the cylinder mechanism 304.

In operation, a brick combination 6, comprising a mat material 10 and a monolith substrate 12, may be placed adjacent to pusher section 310. Upon activation of the cylinder portion 306, the pusher section 310 will move in the direction of opening 312. Pusher section 310 will contact the brick combination 6 and push the brick combination 6 through opening 312. In the depicted embodiment, immediately after traversing opening 312, brick combination 6 moves into the tapered member 314. As brick combination 6 passes through tapered member 314, brick combination 6 is gently compressed. Upon exiting the tapered member 314, brick combination 6 is pushed by pusher section 310 into the outer tube member 4. Once brick combination 6 is positioned within outer tube member 4 at the desired location, pusher section 310 may be withdrawn from outer tube member 4. In general, sufficient frictional force exists between the outer tube member 4 and the brick combination 6 to retain the brick combination 6 in a relatively fixed position as the pusher section 310 is withdrawn.

In accordance with block 120 of FIG. 2, the outer tube material 4 may now be shrunk thereby decreasing the diameter of the outer tube 4. In embodiments, the entirety of outer tube member 4 may be decreased in diameter. In other embodiments, only the portion of outer tube member 4 retaining the brick combination 6 may be reduced in diameter. It should be noted that the diameter of the outer tube member may be decreased in any suitable fashion, such as by way of a shrinker apparatus or a spinning apparatus, including each of the apparatus described in U.S. patent application Ser. No. 10/845,282 assigned to the assignee of the present invention and expressly incorporated herein by reference. In the present embodiment of the invention, the diameter of the outer tube member may be shrunk to a calculated value that depends upon the previously calculated offset that is determined from the gauged size of the brick combination utilized in the outer tube member and the representative relaxed pressure curve.

FIGS. 7a through 7d depict a plurality of section views of a shrinker apparatus, generally indicated by numeral 400. Shrinker 400 comprises a base plate 402 including an aperture 404 extending substantially through its center. A plurality of compressing mechanisms, each generally indicated by numeral 406, is attached to the upper surface of the base place 402. Each compressing mechanism 406 may include a pair of vertical walls 408. Each vertical wall 408 may include an aperture extending substantially through the center. Furthermore, the compressing mechanism 406 may also include an axial support 410 having a circular cross section. Each axial support 410 may be sized so that the support 410 may be positioned within the apertures of the vertical walls 408. In the depicted embodiment, a plurality of mounting screws 412 may affix the vertical walls 408 to the top surface of base plate 402.

Figure 7A:
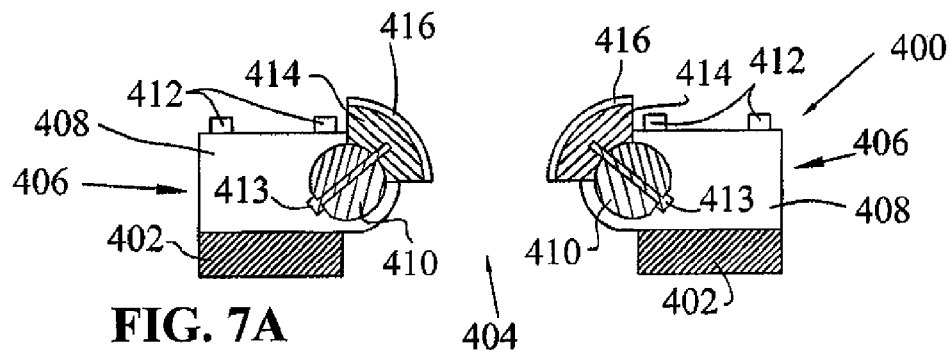
FIGS. 7a through 7d depict a section view of a shrinker apparatus shrinking an outer tube member in an embodiment of the present invention.

Referring still to FIGS. 7a through 7d, the compressing mechanisms 406 may also include an additional mounting screw 413 extending through an aperture in the axial support 410 and into a compressing member 414. The compressing members 414 depicted in the present embodiment take the general shape of a portion of a circle including two straight edges with an arcuate surface 416 extending therebetween. It should be noted that in the embodiment depicted, the arcuate surface includes an arcuate profile designed to conform to the outer surface of outer tube member 4. However, in alternative embodiments, arcuate portion 416 may include a planar profile. The mounting screw 413 may extend into the compressing member 414 and may affix the compressing member 414 to the axial support 410. Furthermore, the position of the compressing members 414 in FIG. 7a is the standard position of unloaded compressing members. In this embodiment of the apparatus, the compressing members 414 are weighted such that the compressing members 414 return to this position whenever the compressing members 414 are not loaded.

Referring still to FIGS. 7a through 7d, the operation of shrinker 400 in shrinking an outer tube member 4 will be described. As shown in FIG. 7a, the compressing members 414 begin in the depicted unloaded position with arcuate surface 416 orientated upwards.

Figure 7B:
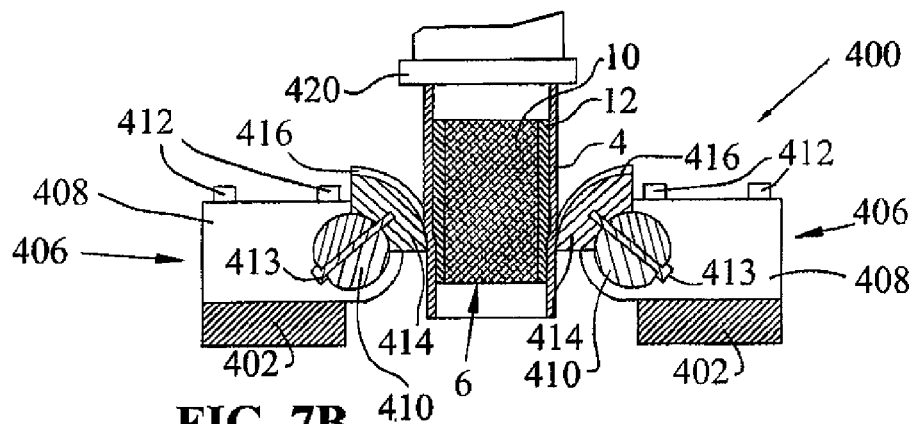

FIG. 7b depicts a step in the compression of the outer tube member 4 utilizing shrinker 400. In the depicted step, the tube 4 is loaded into the shrinker 400 from the direction in which the arcuate surfaces 416 face. It should be noted that the distance separating the compression members 414 through the center of aperture 404 should be less than the pre-compressed outer diameter of outer tube 4.

Figure 7C:
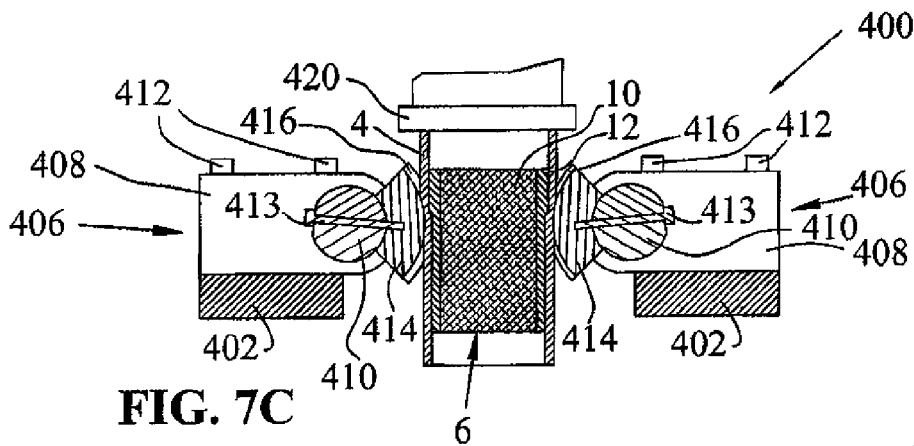

As shown in FIG. 7c, a hydraulic or electromechanical plunger 420 may drive the tube 4 through the shrinker 400. The travel of the outer tube member 4 through the receiving area 404 of the shrinker 400 causes the compressing members 414 to rotate about axial support 410. In addition, the arcuate surfaces 416 of compressing members 414 contact the outer surface of the outer tube 4. The distance separating the arcuate surfaces 416 should be approximately equal to the diameter of the outer tube member 4 previously calculated. The passage of outer tube member 4 through the members 414 compresses the outer tube member 4 and reduces the outer diameter thereof. In addition, it should be noted that at any given time, the compressing members 414 each contact only a portion of the outer tube member 4. Consequently, a lesser force is required to shrink the outer tube member 4 than would be required if the entire surface of the outer tube member 4 were to be compressed along its entire length at one time. In embodiments, shrinker 400 may be designed to shrink outer tube member 4 along its entire length at any one given time.

Figure 7D:
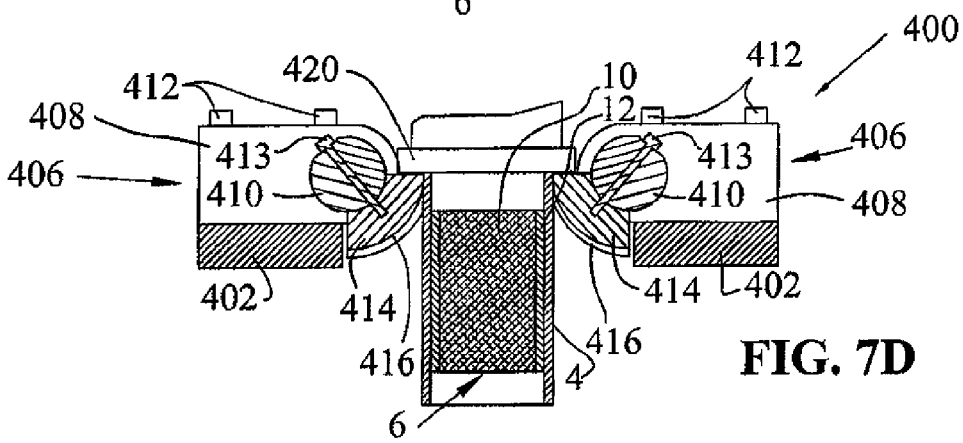

FIG. 7d depicts the outer tube 4 after passing entirely through shrinker 400. It should be noted that the outer diameter of the outer tube 4 is smaller than the outer diameter of the tube 4 prior to deformation. In addition, it should be noted that in the illustrated embodiment of the shrinker 400, the length of the outer tube 4 is limited in length to that of the arcuate surface 416.

It should be noted that any suitable apparatus may be utilized either in conjunction with or in replacement of shrinker 400 to shrink the outer tube member 4. For example, a spinning mechanism may be utilized to decrease the diameter of the outer tube member 4 in a suitable manner.

Once the diameter of outer tube member 4 has been reduced in size in order to compress the mat material 12 of the brick combination 6 against the reduced outer tube member 4 in order to retain the brick combination 6 in a fixed position, the ends 30, 32 of the outer tube member 4 may be reduced in any suitable manner. In the embodiment of the catalytic converter depicted in FIG. 1, heat shield members 14 may be inserted into the openings on either end 30, 32 of the outer tube member 4. The ends 30, 32 of the outer tube member 4 may then be reduced in any suitable manner, such as by way of a spinning apparatus, to form the reduced diameter tube ends 30, 32. The reduction in the diameter of the ends 30, 32 of the outer tube member 4 allows the outer tube member 4 to retain the heat shield members 14 in a relatively fixed position.

Once the diameter of the ends 30, 32 of the catalytic converter 2 has been reduced, the assembly of the catalytic converter 2 has been completed. In the assembly of subsequent catalytic converters, the entire method described above need not be repeated. Instead, the assembly processes may begin with the gauging of the brick combination 6 including the monolith substrate 10 and mat material 12 to be utilized in the assembly of the subsequent catalytic converter 2. When determining the desired final diameter of the outer tube member 4 of the subsequent catalytic converter 2, the data curve that was previously obtained of the representative samples may be utilized in the calculation of the final diameter of the outer tube member 4.

For illustrative purposes, the following represents a simplified example of calculating an offset. In the following example, the curve of FIG. 5 represents a representative curve determined prior to the gauging of a sample. It should be noted that with respect to the representative curve shown in FIG. 5, the best fit curve for the data points measured is $y=30.581e^{0.9556x}$ where "x" is the displacement and "y" is the pressure. Accordingly, the derivative equation of the curve is $y'=30.581e^{0.9556x}$. In the following simplified example, the pressure desired to be asserted on the mat material and monolith substrate combination in a final converter assembly is about equal to 70 psi.

In the present example, the target gauging pressure is approximately 90% of the final pressure, or 63 psi. Thus, the brick combination to be utilized in the final converter assembly may be first compressed until a pressure of 63 psi is asserted onto the brick combination by the gauge station, in the manner described above. Once the 63 psi pressure is reached, the gauge station will record the displacement and then withdraw the gauging members from the brick combination. In the present example, the gauge station measured a displacement value of 0.73 mm when asserting a pressure value of 63 psi on the brick combination. Once the pads are withdrawn from the brick combination, the brick combination may again be compressed to the displacement of 0.73 mm and the change in the pressure asserted by the gauge member is measured over a predetermined dwell time. In the present example, the pressure asserted by the brick combination at the substantially fixed diameter changed by approximately 5 psi from the dwell time.

With the information determined above, the offset may be calculated in any suitable manner. In the present example, the offset is calculated with a linear equation in which $\Delta y=m*\Delta x+b$, with $\Delta y$ representing the pressure change of the gauge brick combination over the dwell time, m representing the slope of the representative curve at the test point and $\Delta x$ representing the offset. It should be noted that b represents the y intercept, which is generally 0. Accordingly, it is clear that $\Delta x=\Delta y/m$, or the offset is equal to the pressure change divided by the slope. In the present instance, the slope of the representative curve at the 63 psi test point is 63. This may be determined by solving the equation of the curve for the displacement at the test pressure, differentiating the equation and then using the calculated displacement to obtain the slope of the curve at the calculated displacement, Accordingly, the $\Delta x$, or the offset, may be calculated in the present example by dividing $\Delta y/m$, or $5/63$, which is equal to 0.079.

As stated above, the target pressure for this example is 70 psi. According to the representative curve in FIG. 5, a displacement of 0.867 mm should achieve the desired 70 psi value. This value must be offset by the $\Delta x$ of 0.079 mm, calculated above, in order to account for the loss in pressure due to the recompression for the gauged combination. Thus, the target displacement for the gauged combination is 0.946 mm. Accordingly, the outer tube member 4 should be reduced in size in order to ensure the outer diameter of the brick combination is approximately equal to 0.946 mm in the final assembly.

As would be understood by one with skill in the art, the steps of the above process may be altered in any suitable manner. For example, the outer tube member 4 may be sized with a shrinker 400, a spinning mechanism, or any other suitable apparatus prior to the insertion of the brick combination 6 into the outer tube member 4. Once the diameter of the outer tube member 4 has been properly set, the brick combination 6 may then be inserted into the outer tube member 4. In other embodiments of the invention, the desired diameter of the outer tube member 4 may be such that the diameter of the outer tube member 4 may have to be increased rather than reduced. Accordingly, as would be understood by one with skill in the art, an expander may be utilized to expand the diameter of the outer tube member 4. Once the expander has expanded the diameter of the outer tube member 4 to the desired size, the brick combination 6 may then be inserted into the expanded outer tube member 4 in a conventional manner.

While this invention has been described as having an exemplary design, the present invention may be further modified within the spirit and scope of this disclosure. The application is intended, therefore, to cover any variations, uses, or adaptations of the invention using its general principles. Further, this application is intended to cover such departures from the present disclosure as come within known or customary practice in the art to which this invention pertains.

The invention claimed is:

1. A method of manufacturing a catalytic converter comprised of an outer tube, a monolith substrate and a mat material, wherein the mat material is positioned in a surrounding relation to the monolith substrate; the method comprising the steps of:

establishing a curve representative of the characteristics of the mat material;

gauging a combination of said monolith substrate and said mat material to establish a set of compression characteristics;

inserting said combination of said monolith substrate and said mat material into the outer tube;

determining a diameter of the outer tube necessary to assert a desired pressure on said combination based upon said curve and said set of compression characteristics; and sizing the diameter of the outer tube so that the diameter is approximately equivalent to the determined diameter;

wherein said gauging step includes the steps of:
compressing said combination until a gauging desired pressure value is reached;
determining the displacement of the outer boundary of said combination at said desired pressure value;
releasing said combination from compression;
recompressing said combination until reaching the displacement of the outer boundary of said combination;
measuring the pressure asserted on said combination; and
releasing said combination from compression.

2. The method of manufacturing a catalytic converter as set forth in claim 1 wherein said gauging desired pressure value falls within a range of about 30% to 99% of the desired pressure.

3. The method of manufacturing a catalytic converter as set forth in claim 1 wherein said gauging desired pressure value falls within a range of about 30% to 98% of the desired pressure.

4. The method of manufacturing a catalytic converter as set forth in claim 1 wherein said gauging desired pressure value falls within a range of about 30% to 95% of the desired pressure.

5. The method of manufacturing a catalytic converter as set forth in claim 1 wherein said gauging desired pressure value falls within a range of about 30% to 90% of the desired pressure.

6. The method of manufacturing a catalytic converter as set forth in claim 1 wherein said gauging desired pressure value falls in within a range of about 30% to 80% of the desired pressure.

7. The method of manufacturing a catalytic converter as set forth in claim 1 wherein said step of measuring the pressure asserted on said combination occurs approximately fifteen seconds after the recompressing step.

8. The method of manufacturing a catalytic converter as set forth in claim 1 wherein the mat material is at least partially formed from an intumescent material.

9. The method of manufacturing a catalytic converter as set forth in claim 1 wherein said sizing step includes shrinking the outer tube member.

10. The method of manufacturing a catalytic converter as set forth in claim 1 wherein said sizing step includes expanding the outer tube member.

11. The method of manufacturing a catalytic converter as set forth in claim 1 wherein said step of measuring the pressure asserted on said combination further includes the step of monitoring the pressure asserted on said combination until a substantially settled pressure value is achieved.

12. The method of manufacturing a catalytic converter as set forth in claim 11 wherein said step of monitoring the pressure asserted on said combination until a substantially settled pressure value is achieved further includes the steps of populating a matrix of finite size with pressure values until said matrix is filed and then replacing the oldest values with the newest values until the newest value is substantially equal to the oldest value.

13. The method of manufacturing a catalytic converter as set forth in claim 1 wherein linear regression is utilized in said determining the diameter of the outer tube necessary to assert said desired pressure on said combination.

14. The method of manufacturing a catalytic converter as set forth in claim 13 wherein a change in pressure is measured in said gauging step, said change in pressure being approximately equal to the difference between said desired pressure value and said measure pressure asserted on said combination and said curve has a slope at said determined displacement, wherein an offset may be determined by dividing said change in pressure by said slope, said offset and said curve combining to determine said diameter of said outer tube.

15. The method of manufacturing a catalytic converter as set forth in claim 1 wherein the establishing step includes the step of compressing at least a portion of a representative mat material encompassing a member to obtain a first set of force data.

16. The method of manufacturing a catalytic converter as set forth in claim 15 wherein said member is a blank.

17. The method of manufacturing a catalytic converter as set forth in claim 15 wherein said member is a representative monolith substrate.

18. The method of manufacturing a catalytic converter as set forth in claim 15 further including the step of compressing a least a second portion of said representative combination in order to obtain a second set of force data.

19. The method of manufacturing a catalytic converter as set forth in claim 15 wherein the compressing step includes advancing at least one contact pad a predetermined displacement into said mat material and collecting a pressure value following the elapsing of a predetermined time, advancing said at least one contact pad said predetermined displacement into said mat material and collecting a second pressure value following the elapsing of said predetermined time.

20. The method of manufacturing a catalytic converter as set forth in claim 19 wherein said predetermined time is approximately equal to fifteen seconds.

21. The method of manufacturing a catalytic converter as set forth in claim 15 wherein the establishing step includes the step of compressing at least a portion of a plurality of mat material encompassing a member to obtain a plurality of force data.

22. The method of manufacturing a catalytic converter as set forth in claim 21 wherein said plurality of mat material differ in thickness.

23. The method of manufacturing a catalytic converter as set forth in claim 21 wherein said plurality of mat material differ in weight.

24. The method of manufacturing a catalytic converter as set forth in claim 21 wherein said plurality of force data is utilized to plot said curve.

* * * * *